G. A. BOYDEN, Jr., AND J. C. BOYDEN.
RAILWAY CAR TRUCK.
APPLICATION FILED AUG. 5, 1919.

1,341,777.

Patented June 1, 1920.

Inventors
George A. Boyden, Jr.,
and John C. Boyden

By John W. Darley.
Attorney

G. A. BOYDEN, Jr., AND J. C. BOYDEN.
RAILWAY CAR TRUCK.
APPLICATION FILED AUG. 5, 1919.

1,341,777.

Patented June 1, 1920.

G. A. BOYDEN, Jr., AND J. C. BOYDEN.
RAILWAY CAR TRUCK.
APPLICATION FILED AUG. 5, 1919.
1,341,777.
Patented June 1, 1920.
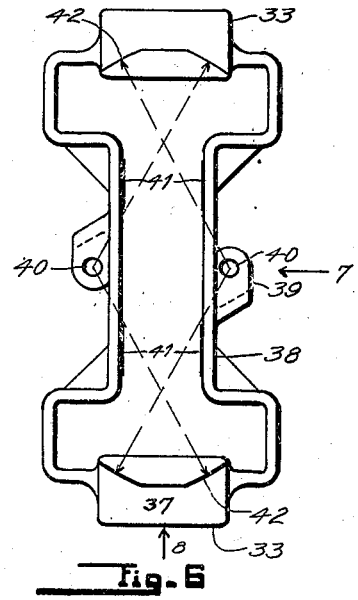
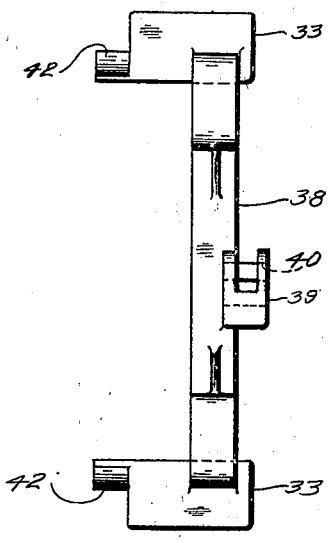
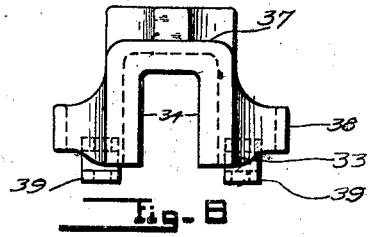

UNITED STATES PATENT OFFICE.

GEORGE A. BOYDEN, JR., AND JOHN C. BOYDEN, OF BALTIMORE, MARYLAND.

RAILWAY-CAR TRUCK.

1,341,777. Specification of Letters Patent. Patented June 1, 1920.

Application filed August 5, 1919. Serial No. 315,427.

*To all whom it may concern:*

Be it known that we, GEORGE A. BOYDEN, Jr., and JOHN C. BOYDEN, citizens of the United States, residing at Baltimore, in the State of Maryland, have invented certain new and useful Improvements in Railway-Car Trucks; and we do hereby declare the following to be a full, clear, and exact description of the invention, such as will enable others skilled in the art to which it appertains to make and use the same.

Our invention relates to railway car trucks.

Our application for U. S. Letters Patent for railway car trucks which was filed May 22, 1919, and serially numbered 298953 involves a truck comprising members that act coördinately horizontally so that the wheels and journals will conform to the contour of the rails whatever it may be.

The truck shown in said pending application also involves vertical actions of the members which differ from equalized vertical actions, but the former actions have not been fully specified in said pending application as they are to form the subject matter of a later application.

The present application is intended to cover generically a truck comprising members that act coördinately horizontally as in the truck shown in said pending application and which also have an equalized vertical action, wherein the vertical action of the truck members shown in this application differs from the vertical action of the truck members that will form the subject matter of a later application which will pertain to the vertical action of the members of said pending application.

One object of our invention is to provide a method according to which the journals are placed in such mutual relations and in such mutual angularity as to reduce the stresses against the wheel flanges produced by the outer rail of a curve near its junction with the tangent, and also to minimize the pressure of the rails against the wheel flanges when any or all of the wheels are running upon curves, while equalizing the vertical load stresses upon the journals.

A further object of our invention is to produce a truck in which the various elements are so constructed and arranged that the wheels are moved laterally by the rails to conform therewith and an angular movement of the journals is produced by this motion, so that the flanges of the wheels are set to minimize their friction against the rails while at the same time the vertical stresses due to the load are equally distributed to the journals.

A further object of our invention is to produce a truck having a minimum of parts and requiring a minimum of machine work in its construction.

One set of combinations of elements by which may be effectuated our improved method for reducing the stresses of the rails against the wheel flanges and for equalizing the vertical load stresses upon the journals will now be described and the method and combinations will be pointed out in the claims, but it is to be understood that our improved method may be effectuated by many combinations of elements other than those in the truck described and claimed, also that many changes may be made in said truck without departing from the spirit of so much of our invention as is embodied in said truck.

It is also to be understood that while we have shown our invention as applied in a six wheel truck, it is not to be understood as being limited in its application to trucks having six wheels.

One embodiment of means for effectuating our improved method is shown in the accompanying drawing, in which:—

Fig. 6 is a plan view of the central bolster.

Fig. 7 is a view of the bolster shown in Fig. 6 looking in the direction of the arrow 7 in said figure.

Fig. 8 is a view of the bolster shown in Fig. 6 looking in the direction of the arrow 8 in said figure.

Figure 1:
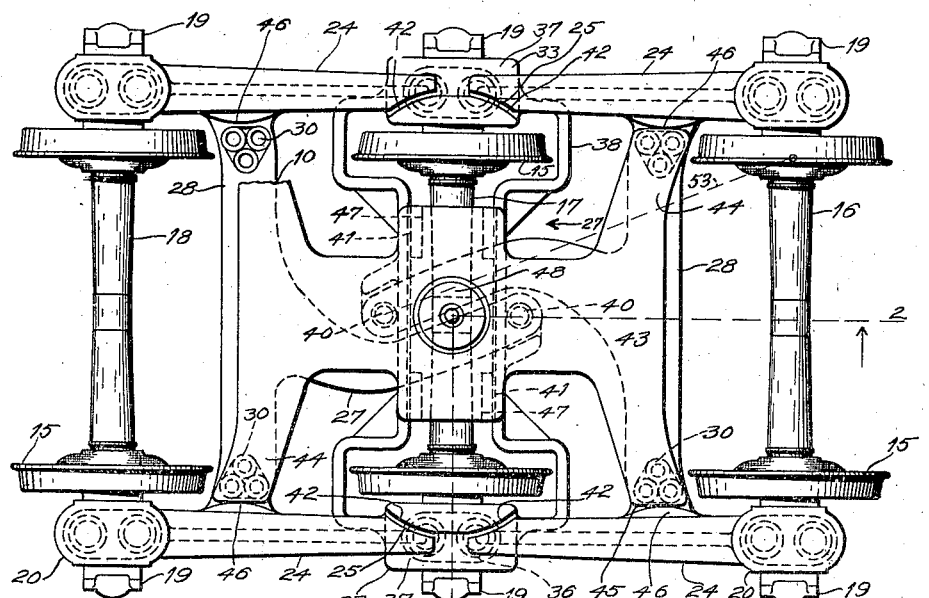
Figure 1 is a plan view of a truck constructed and arranged to operate according to our improved method. In this view, the coördinating plate is broken away as at 10 in order to show the subjacent springs.

Throughout the specifications and claims, a longitudinal movement or stress will be that in the direction of the length of the rails and a transverse movement or stress will be that in a direction transverse to the rails.

In the drawings:—

15 represents the wheels, and 16, 17 and 18 represent, respectively, the pilot, central and trailer axles. The journals of the axles are mounted in any approved form of axle box such as 19 and the axles and wheels are of Master Car Builders' construction.

The pilot and trailer bolsters consist of a pair of pedestals such as 20, each provided with jaws 21 for the reception of an axle box 19, and compression springs such as 23, the lower ends of which bear against the axle box 19. Formed integrally with each pedestal 20 is an arm 24, the end of which is provided with a cylindrical surface such as 25, the latter being concentric with the axis of the hole 26. The hole 26 is formed in the end of the arm 27 and the latter is formed integrally with the truss 28, the arms 24 and the pedestals 20. The truss 28 is formed with sockets such as 29 for the reception of the springs 30. The arms 24 extend upwardly and each is provided on its underside with a boss such as 32. The central bolster consists of a pair of pedestals such as 33, each provided with jaws 34 for the reception of the axle box 19 and compression springs such as 36, the lower ends of which bear against the axle box 19.

The tops 37 of the pedestals 33 are formed flat and upon each of said tops rest the bosses such as 32 of two of the arms 24. The pedestals 33 are formed integrally with the frame 38 and the latter is provided with two offsets such as 39, in each of which is secured a pin 40, and each of said pins passes fairly through the hole 26 in one of the arms 27.

By reason of the freedom of the pin 40 in the hole 26 and the fact that the bosses 32 rest upon the tops 37 without any positive connection therewith, the arm 27 is capable of a universal movement upon said pin. Hence, each bolster may have a vertical and horizontal movement independent of the others.

It is to be noted that the arm 27 of the pilot bolster is pivoted upon the pin 40 which is to the left of the central axle 17 and that the arm 27 of the trailer bolster is pivoted upon the pin 40 to the right of the central axle 17. The frame 38 is provided with finished surfaces as at 41 for a purpose hereinafter referred to; and the pedestals 33 are provided on their tops with bosses having cylindrical faces such as 42, the faces to the right of the axle 17 being concentric with the axis of the pin 40 to the left of said axle, and the faces to the left of said axle being concentric with the axis of the pin 40 to the right of said axle.

The faces 42 closely approach the faces 25 on the ends of the arms 24 but do not fit tightly upon the faces 25.

In Fig. 1 the space between the faces 42 and 25 is greatly enlarged in order to indicate that these faces are not to fit together snugly.

The coördinating plate 43 is provided with four arms such as 44, each of which overlies one set of springs 30 and terminates in a flat surface such as 45, and each of the latter has a longitudinal and vertical sliding engagement with one of the bosses 46 formed upon the arms 24.

The coördinating plate 43 is also provided with four tongues such as 47; the latter extending downwardly and having their outer surfaces finished. Said surfaces have a transverse and vertical sliding engagement with the surfaces 41 formed on the frame 38. The coördinating plate 43 is provided with a king pin 48, or any suitable construction equivalent thereto, upon which one end of the car body is to be pivotally mounted.

The operation of our improved truck is as follows:—

Figure 2:
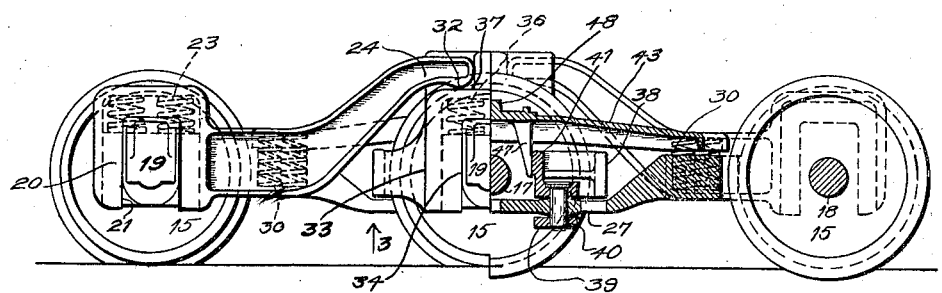
Fig. 2 is a side view of the truck shown in Fig. 1, said view being shown partly in section and the section being taken as along the line 2—2 in Fig. 1 looking in the direction of the arrows.
Figure 3:
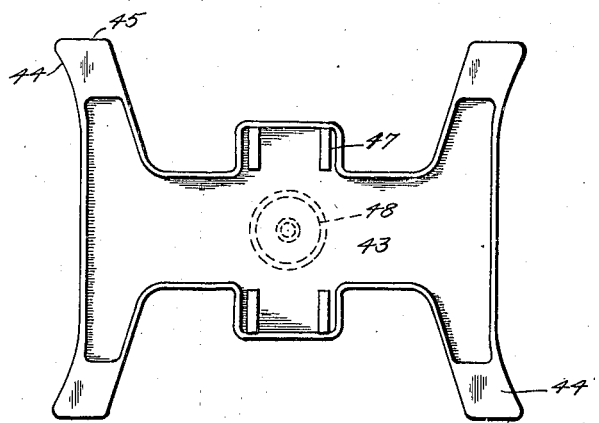
Fig. 3 is a plan view of the coördinating plate taken as viewed in the direction of the arrow 3 in Fig. 2.
Figure 4:
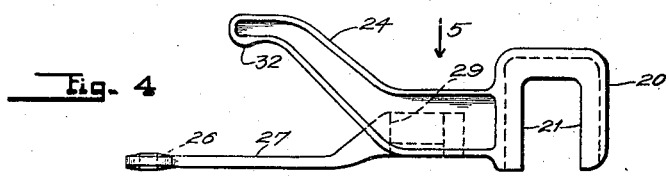
Fig. 4 is a side view of either the pilot or trailer bolster.
Figure 5:
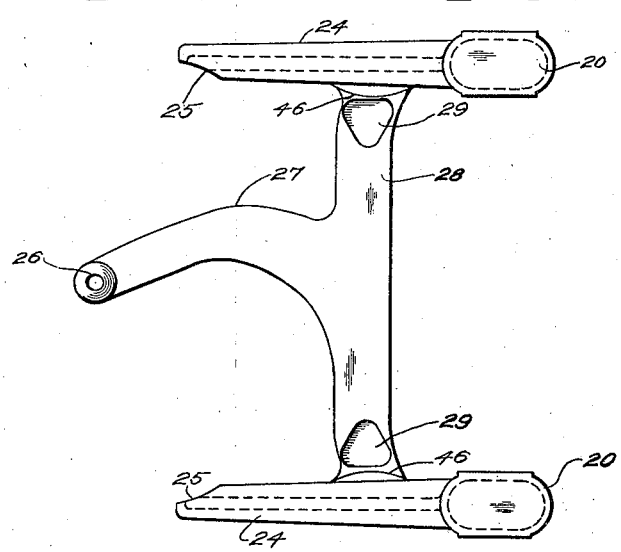
Fig. 5 is a view of the bolster shown in Fig. 4 looking in the direction of the arrow 5 in said figure.

When the wheels are all upon a straight track, the various parts are in the positions shown in Figs. 1 and 2, but as the truck enters a curve, the flange of the outer pilot wheel will strike the outer curved rail and the force due to the impact of said rail against said flange acting in the direction of the straight track will be resolved into two components, one of which is in the direction of the straight line 53 (see Fig. 1) and produces pressure upon the pin 40. The other component is in a direction at right angles to the line 53 and produces pressure of the flange of the pilot wheel against the outer curved rail.

The last-named component is very small because the pilot bolster is pivoted upon the pin 40 to the left of the axle 17, and consequently, the line 53 between the center of said pin and the point of impact of the pilot wheel flange upon the outer curved rail makes a comparatively small angle with the line in which the impact acts. By the minimization of this component a great reduction in train resistance is immediately effected, because in order to rotate the pilot bolster about the pin 40 so that the pilot wheels may conform to the track contour, there is required but a minimum of pressure of the outer curved rail upon the flange of the pilot wheel to overcome this component in addition to overcoming the frictional resistances and the inertia of the mass comprising but the pilot wheels, axle and bolster therefor and part of the weight of the coördinating plate. Consequently, the frictional resistance of the pilot wheel flange against the outer curved rail is minimized.

Since but a minimum of pressure is required to rotate the pilot bolster about the pin 40, the force of the impact of the flange of the pilot wheel upon the outer curved rail is also minimized. The force of the impact is resolved upon the outer curved rail into two components, one transverse to the rail at the point of impact, which produces pressure of said rail upon the flange of the pilot wheel and tends to rotate the bolster; and the other component tangential to, or longitudinal of, said rail, which acts to oppose the motion of the pilot wheel. Since the force of the impact is minimized, the longitudinal component thereof is also minimized, hence it is evident that the train resistance is still further minimized.

When the pilot bolster is rotated as before explained, the structural arrangement is such that the pilot axle 16 is not brought into parallelism with the radius of curvature of the outer curved rail. If it be considered that a vertical line is erected through the center of curvature of the outer curved rail, then the axis prolonged of the pilot axle 16 is not made to pass through said vertical line, but is approached near thereto and on the proper side thereof, so that the forward edge of the flange of the outer pilot wheel will be directed somewhat secant to the outer curved rail. This arrangement of parts is preferable in order that the flange may follow switches, turn-outs and frogs with safety.

By reason of the fact that the faces 45 have a sliding engagement with the bosses 46 when the pilot bolster is rotated as just described, the corresponding end of the coördinating plate 43 is moved with the pilot bolster.

By reason of the transverse sliding engagement of the tongues 47 with the surfaces 41, the central journals are moved angularly so that the flange of the outer central wheel will be properly disposed to follow the contour of the outer rail when it reaches the latter, but the central journals are not moved transversely. During these motions of the pilot and central journals, the trailer journals are not appreciably affected. When all of the wheels are upon curved rails, the central journals are radially disposed, the pilot journals are disposed as before explained and the trailer journals are disposed similarly to the pilot journals, but with the rearward edge of the flange of the outer trailer wheel directed somewhat secant to the outer curved rail.

The construction by which this result is effected is advisable so that when the direction of motion of the truck is reversed and the trailer axle becomes the pilot axle, then the outer wheel upon said trailer axle will follow switches, turn-outs and frogs as before explained with reference to the outer wheel upon the pilot axle 16.

One quarter of the vertical stress imposed by the load upon the king pin 48 is applied by the coördinating plate 43 to the tops of each set of the springs 30, and by the bottoms of said springs to the pilot and trailer bolsters. Part of the load so applied to the pilot and trailer bolsters eventuates in pressure upon the pilot and trailer journals, and the remaining part is transmitted through the arms 24 to the pedestals 33 and eventuates as pressure upon the central journals.

The location of the springs 30, with reference to the journals of the axles 16 and 18 and the points of contact of the bosses 32 with the tops 37 of the pedestals 33 of the central bolster, is such that the vertical load stress upon the king pin 48 is equally distributed to the journals.

Hence, the coördinating plate 43 acts in conjunction with the bolsters to horizontally coördinate angularly the central journals to the pilot and trailer journals, and also acts to transmit vertical load stresses to the journals.

It is to be noted that the pilot and trailer journals assume transverse and angular positions determined by the contour of the rails, and that the transverse positions of the central journals are also determined by the contour of the rails, but that the angularity of the central journals with reference to the other journals is controlled by the pilot and trailer journals through the coördinating plate.

It is also to be noted that by reason of the vertical sliding engagement of the faces 45 with the bosses 46 and of the tongues 47 with the finished surfaces 41, that each bolster can move vertically independently of the others and of the coördinating plate, and that the latter also acts as an equalizing plate to distribute the vertical load stresses from the king pin to the journals.

Thus, the coördinating plate performs the double function of coördinating the journals horizontally to mutual angularity suitable for the contour of the rails, and of transmitting vertical load stresses to the journals which are equalized.

Thus it is evident, that by the application of our method, the train resistance is minimized by the following expedients:—

The minimization at the entrance of curves of the force of the impact of the outer rail upon the flange of the pilot wheel, due to the great reduction in the mass to be rotated, and the favorable location of the axis of rotation thereof, which results in a great reduction of pressure and consequent minimization of friction between the outer rail and the flange of the pilot wheel and also in a great reduction of resistance to the forward motion of said wheel.

The controlled mutual angularity of the journals when all the wheels are upon curved rails, which results in a minimum of friction between the wheels and rails.

The equalization of the vertical load stresses upon the journals while the latter are horizontally coördinated angularly, which results in a minimum of stress upon each wheel.

We claim:—

1. The herein described method, of coördinating horizontally the journals of a six wheel truck comprising a coördinating plate and of equalizing the vertical stresses upon said journals, which consists in moving the wheels by the rails to conform the journals to the contour of the latter, shifting the pilot and trailer journals angularly to approximate parallelism with the radii of curvature of the rails, coördinately moving the central journals angularly by said coördinating plate, and transmitting to said journals through said coördinating plate vertical load stresses which are equalized.

2. In a six wheel truck, the combination with a bolster for each axle, a universal connection between the central bolster and each of the pilot and trailer bolsters and a coördinating plate having a transverse sliding connection with the central bolster, a longitudinal sliding connection with each of the pilot and trailer bolsters, and a vertically resilient connection with each of the pilot and trailer bolsters.

3. In a six wheel truck, the combination with a bolster for each axle, a universal connection between the central bolster and each of the pilot and trailer bolsters, said connections for each of said pilot and trailer bolsters being on the far side of said central bolster, and a coördinating plate having a transverse sliding connection with the central bolster, a longitudinal sliding connection with each of the pilot and trailer bolsters, and a vertically resilient connection with each of the pilot and trailer bolsters.

4. In a six wheel truck, the combination with a bolster for each axle, a universal connection between the central bolster and each of the pilot and trailer bolsters and a coördinating plate having a transverse sliding connection with the central bolster, a longitudinal sliding connection with each of the pilot and trailer bolsters, and a load distributing connection with each of the pilot and trailer bolsters.

5. In a six wheel truck, the combination with a bolster for each pair of journals, a coördinating plate engaging with the central bolster and with each of the pilot and trailer bolsters, springs between said coördinating plate and each of said pilot and trailer bolsters, and a connection between each of said pilot and trailer bolsters and said central bolster, whereby said coördinating plate controls the angular position of the central journals and transmits to all of said journals vertical load stresses which are equalized.

6. In flanged wheel railway truck construction, the combination with the leading, trailing and intermediate wheel axles articulated for relative endwise and angular movement in entering and traversing a curved track, of means controlled by the leading axle for changing the angular position of the intermediate axle without moving the same endwise, said means also acting to transmit equalized vertical load stresses to said axles.

In testimony whereof we affix our signatures.

GEORGE A. BOYDEN, Jr.
JOHN C. BOYDEN.